(12) United States Patent
Marble et al.

(10) Patent No.: US 9,969,231 B2
(45) Date of Patent: May 15, 2018

(54) DAMPER ASSEMBLY AND A METHOD OF FORMING THE DAMPER ASSEMBLY

(71) Applicant: GM GLOBAL TECHNOLOGY OPERATIONS LLC, Detroit, MI (US)

(72) Inventors: Robert P. Marble, White Lake, MI (US); Robert G. Izak, Dryden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 179 days.

(21) Appl. No.: 14/800,292

(22) Filed: Jul. 15, 2015

(65) Prior Publication Data
US 2017/0015172 A1    Jan. 19, 2017

(51) Int. Cl.
*B60G 13/08* (2006.01)
*F16F 9/18* (2006.01)
(Continued)

(52) U.S. Cl.
CPC ............... *B60G 13/08* (2013.01); *B60G 3/20* (2013.01); *B60G 17/08* (2013.01); *F16F 9/06* (2013.01);
(Continued)

(58) Field of Classification Search
CPC ............... B60G 13/08; B60G 2206/41; B60G 2206/8105; B60G 2206/8111;
(Continued)

(56) References Cited

U.S. PATENT DOCUMENTS 1,409,849 A * 3/1922 Haeberlein ............... F16F 9/50
188/318
1,468,652 A * 9/1923 Storey .................... B60G 13/08
16/66
(Continued)

FOREIGN PATENT DOCUMENTS

| CN | 2789505 Y | 6/2006 |
|---|---|---|
| CN | 201093026 Y | 7/2008 |
| SU | 1249230 A1 | 8/1986 |

OTHER PUBLICATIONS

Bilstein 2014 Online Catalog webpage: http://www.bilsteinus.com/products/truck-off-road/9300-series-black-hawk/; 1 page; accessed on Oct. 6, 2014.
(Continued)

*Primary Examiner* — Xuan Lan Nguyen
(74) *Attorney, Agent, or Firm* — Quinn IP Law

(57) ABSTRACT

A damper assembly includes a housing. A method of forming a damper assembly includes extruding the housing formed of aluminum. The housing defines a first chamber and a first passage spaced from each other, with a first inlet fluidly connecting the first chamber and the first passage. A piston is disposed in the first chamber and is movable in a first direction and a second direction opposite the first direction. A first restrictor valve is disposed in the first passage. The first restrictor valve is configured to restrict a flow of liquid into the first passage from the first chamber and the first inlet as the piston moves in one of the first and second directions which causes the liquid in the first chamber to increase a pressure applied to a first side of the piston to dampen movement of the piston.

18 Claims, 3 Drawing Sheets

(51) Int. Cl.
*F16F 9/53* (2006.01)
*F16F 9/06* (2006.01)
*B60G 17/08* (2006.01)
*B60G 3/20* (2006.01)

(52) U.S. Cl.
CPC .............. *F16F 9/185* (2013.01); *F16F 9/187* (2013.01); *F16F 9/537* (2013.01); *B60G 2202/24* (2013.01); *B60G 2206/41* (2013.01); *B60G 2206/8105* (2013.01); *B60G 2206/8111* (2013.01); *B60G 2500/112* (2013.01)

(58) Field of Classification Search
CPC ..... B60G 2500/112; F16F 9/096; F16F 9/185; F16F 9/537; F16F 9/187; F16F 9/06; F16F 9/44
USPC ......................................................... 188/318
See application file for complete search history.

(56) References Cited

U.S. PATENT DOCUMENTS

| | | | | |
|---|---|---|---|---|
| 1,480,170 A * | 1/1924 | Logan | ................ | B66B 5/08 188/318 |
| 1,492,328 A * | 4/1924 | Lang | ................ | F16F 9/504 188/275 |
| 1,560,477 A * | 11/1925 | Kessler | ................ | F16F 9/44 188/129 |
| 1,571,788 A * | 2/1926 | Bramlette, Jr. | ............ | F16F 9/44 188/129 |
| 2,048,037 A * | 7/1936 | Smith | ................ | F16F 9/44 188/281 |
| 2,122,407 A * | 7/1938 | Chisholm, Jr. | ......... | F16F 9/443 188/318 |
| 2,239,112 A * | 4/1941 | Nickelsen | ............... | F16F 9/064 16/DIG. 21 |
| 2,756,989 A * | 7/1956 | Peras | ................ | B21J 13/06 188/314 |
| 3,795,291 A * | 3/1974 | Naito | ................ | B62K 25/283 188/274 |
| 4,969,643 A * | 11/1990 | Kroeker | ............. | A63B 21/0083 188/312 |
| 5,586,627 A * | 12/1996 | Nezu | ................ | B60G 17/08 188/266.6 |
| 5,682,968 A * | 11/1997 | Boichot | ............. | B60G 17/0152 188/266.2 |
| 6,926,128 B2 * | 8/2005 | Barbison | ................ | B60G 17/08 188/315 |
| 2005/0022355 A1* | 2/2005 | van Wonderen | ........ | F16F 9/096 29/428 |
| 2006/0102440 A1* | 5/2006 | Nygren | ................. | B25B 13/48 188/314 |
| 2006/0118374 A1* | 6/2006 | Wallen | .................. | B62K 25/08 188/318 |
| 2015/0285326 A1* | 10/2015 | Battlogg | ................ | F16F 9/535 188/267.2 |

OTHER PUBLICATIONS

Fludicon Automotive webpage: http://www.fludicon.com/; 3 pages; accessed on Oct. 6, 2014.
Article entitled: "Shock Absorber", from Wikipedia, the free encyclopedia webpage: https://en.wikipedia.org/wiki/Shock_absorber; 7 pages; accessed on Oct. 9, 2014.
Article entitled: "ZF Technology for Cars Chassis Systems" from the ZF webpage: http://www.zf.com/corporate/en/products/product_range/cars/cars_cdc.shtml; 2 pages; accessed on Oct. 6, 2014.
Article entitled: "ZF Technology for Cars Damping" from the ZF webpage: http://www.zf.com/corporate/en/products/product_range/cars/cars_nivomat.shtml; 2 pages; accessed on Oct. 6, 2014.
Magneride Controlled Suspension System from BWI Group webpage: http://www.bwigroup.com/en/pshow.php? pid=22; 2 pages; accessed on Oct. 6, 2014.
Article entitled "Suspension Technology" from the ZF webpage: http://www.zf.com/media/media/en/productfinder_media/cars/cars_suspension_technology_cdc/pdf_53/doppelseiten_daempfungsmodule_engl_20110823.pdf; 12 pages; accessed on Nov. 19, 2014.

* cited by examiner

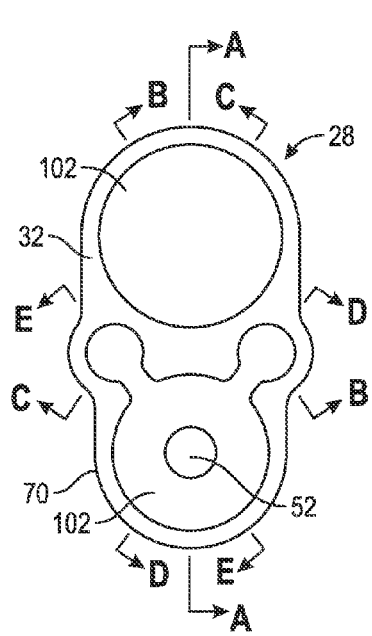
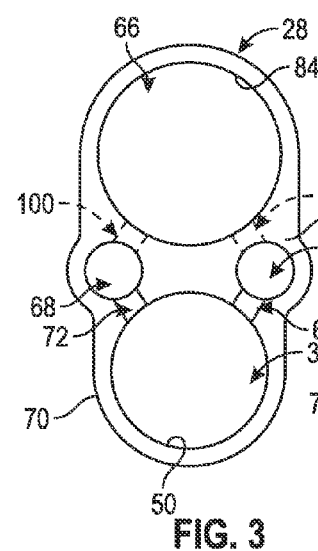
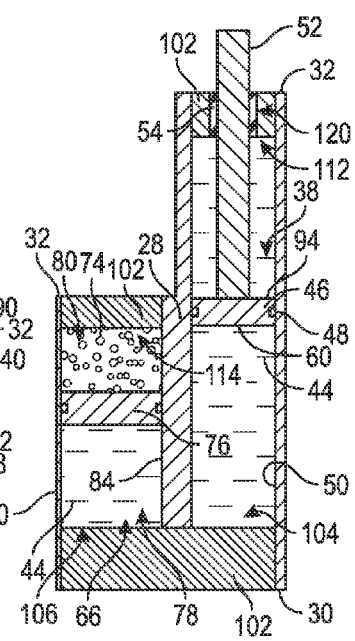
FIG. 2     FIG. 3     FIG. 6
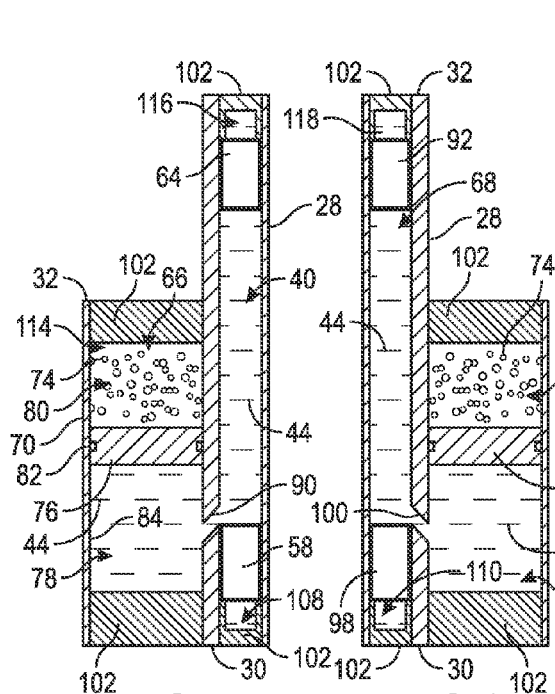
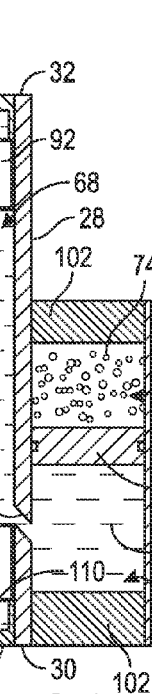
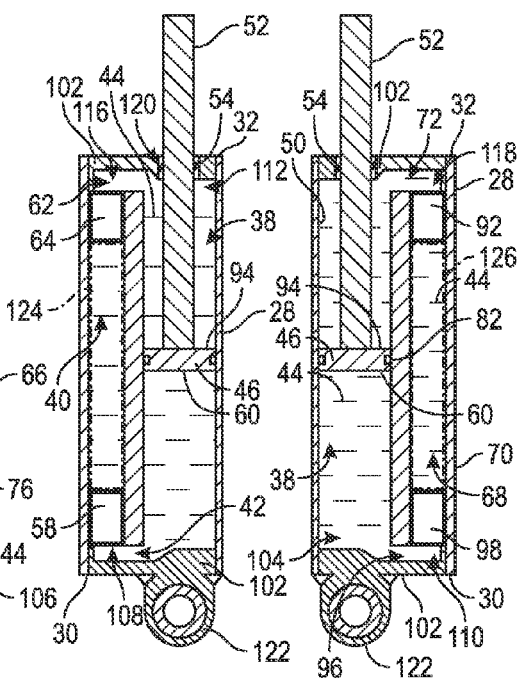
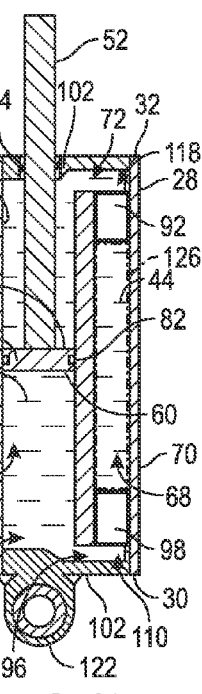
FIG. 7     FIG. 8     FIG. 9     FIG. 10

DAMPER ASSEMBLY AND A METHOD OF FORMING THE DAMPER ASSEMBLY

TECHNICAL FIELD

The present disclosure relates to a damper assembly and a method of forming the damper assembly.

BACKGROUND

Damper assemblies are used in vehicle suspension systems to dissipate energy from road forces applied to the vehicle wheels as the vehicle travels over a road. Generally, the damper assemblies control the transfer of forces to the sprung mass of the vehicle. Dampers act between the vehicle wheels and sprung mass to control the energy transfer to the vehicle frame and body while maintaining contact between the tires and the road.

Monotube dampers utilize a single tube, with a piston assembly movable within the tube. The piston assembly is connected to the vehicle body, and the single tube of the damper is coupled to a tire and wheel assembly. A piston-rod of the piston assembly moves within the single tube and a portion of the rod of the piston-rod extends out of the tube. A gas chamber with a floating piston of the piston assembly is housed at an end of the single tube opposite a rod end of the piston-rod. The floating piston separates a gas chamber of the single tube and a fluid-filled chamber of the single tube. The floating piston moves to accommodate the volume displacement caused by the moving piston-rod. The gas chamber is filled with a gaseous fluid and the fluid-filled chamber is filled with a liquid. Some of the gaseous fluid can be stored in the gas chamber being located in a separate container from the single tube, and this gaseous fluid is fluidly connected to the single tube proximal to the end of the single tube opposite the rod end.

Twintube dampers utilize a pair of tube which are positioned concentric to each other. Therefore, an inner tube is nested or surrounded by an outer tube, and these tubes are in fluid communication with each other. Specifically, the inner and outer tubes are concentric to each other. The inner tube is filled with a liquid and the outer tube is partially filled with the liquid and partially filled with a gaseous fluid. Therefore, the outer tube presents a gas chamber. A piston assembly is movable within the inner tube. The piston assembly is connected to the vehicle body, and the twintube of the damper is coupled to a tire and wheel assembly. A piston-rod moves within the inner tube and a portion of the rod of the piston-rod extends out of the tube.

For the monotube, pressurized gas in the gas chamber requires a static pressure level commensurate with a desired damping ability of the damper assembly. Seals within the damper, such as a seal around the moving rod of the piston-rod, is designed in accordance with the static and dynamic range of pressures. A high static pressure level and tight rod seal will contribute to friction against the moving rod.

Some suspension systems are passive, so that pre-load, spring rate, and ride height of the vehicle are nonadjustable, single predetermined values determined by the design of the damper assembly. In some systems, pre-load, spring rate, and ride height are variable, but not all in a controlled manner. Other suspension systems are actively controlled, so that the spring rate or the preload of the vehicle can be varied. One active design utilizes a monotube damper with an external accumulator.

SUMMARY

The present disclosure provides a damper assembly including a housing. The housing defines a first chamber and a first passage spaced from each other. The housing also defines a first inlet that fluidly connects the first chamber and the first passage. The first chamber, the first passage and the first inlet are each configured to contain a liquid. The damper assembly includes a piston disposed in the first chamber and is movable in a first direction and a second direction opposite the first direction. The piston is configured to displace the liquid during movement in the first and second directions. The damper assembly further includes a first restrictor valve disposed in the first passage. The first restrictor valve is configured to restrict a flow of the liquid into the first passage from the first chamber and the first inlet as the piston moves in one of the first and second directions which causes the liquid in the first chamber to increase a pressure applied to a first side of the piston to dampen movement of the piston.

The present disclosure also provides a method of forming a damper assembly. The method includes extruding a housing formed of aluminum, with the housing defining a first chamber and a first passage spaced from each other. The method also includes milling a first distal end of the housing to partially form a first inlet that fluidly connects the first chamber and the first passage. The method further includes disposing a piston in the first chamber and inserting a first restrictor valve in the first passage.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 2 is a schematic end view of the damper assembly.

FIG. 3 is a schematic end view of a housing of the damper assembly of FIG. 2 with the components that close the housing removed and the components inside the housing removed.

FIG. 4 is a schematic circuit diagram of the damper assembly when a piston moves toward a first end of a first chamber, i.e., compression.

FIG. 5 is a schematic circuit diagram of the damper assembly when the piston moves toward a second end of the first chamber, i.e., rebound.

FIG. 6 is a schematic cross-sectional view of the damper assembly taken from lines A-A of FIG. 2.

FIG. 7 is a schematic cross-sectional view of the damper assembly taken from lines B-B of FIG. 2.

FIG. 8 is a schematic cross-sectional view of the damper assembly taken from lines C-C of FIG. 2.

FIG. 9 is a schematic cross-sectional view of the damper assembly taken from lines D-D of FIGS. 2 and 11.

FIG. 10 is a schematic cross-sectional view of the damper assembly taken from lines E-E of FIGS. 2 and 11.

FIG. 13 is a schematic cross-sectional view of a second chamber of the housing having a member therein of a different configuration from the schematic of FIG. 4.

FIG. 19 is a schematic circuit diagram of the damper assembly when the piston moves toward the first end of the first chamber, with an actuator coupled to the housing in different locations.

DETAILED DESCRIPTION

Those having ordinary skill in the art will recognize that terms such as "above", "below", "upward", "up", "downward", "down", "top", "bottom", "left", "right", "back", "forth", "vertical", "horizontal", etc., are used descriptively for the figures, and do not represent limitations on the scope of the disclosure, as defined by the appended claims. As such, all directional references (e.g., the terms in the above sentence) are only used for identification purposes to aid the reader's understanding, and do not create limitations, particularly as to the position, orientation, or use of the disclosure. Furthermore, the term "substantially" can refer to a slight imprecision or slight variance of a condition, quantity, value, or dimension, etc., some of which that are within manufacturing variance or tolerance ranges that can be subject to human error.

Figure 1:
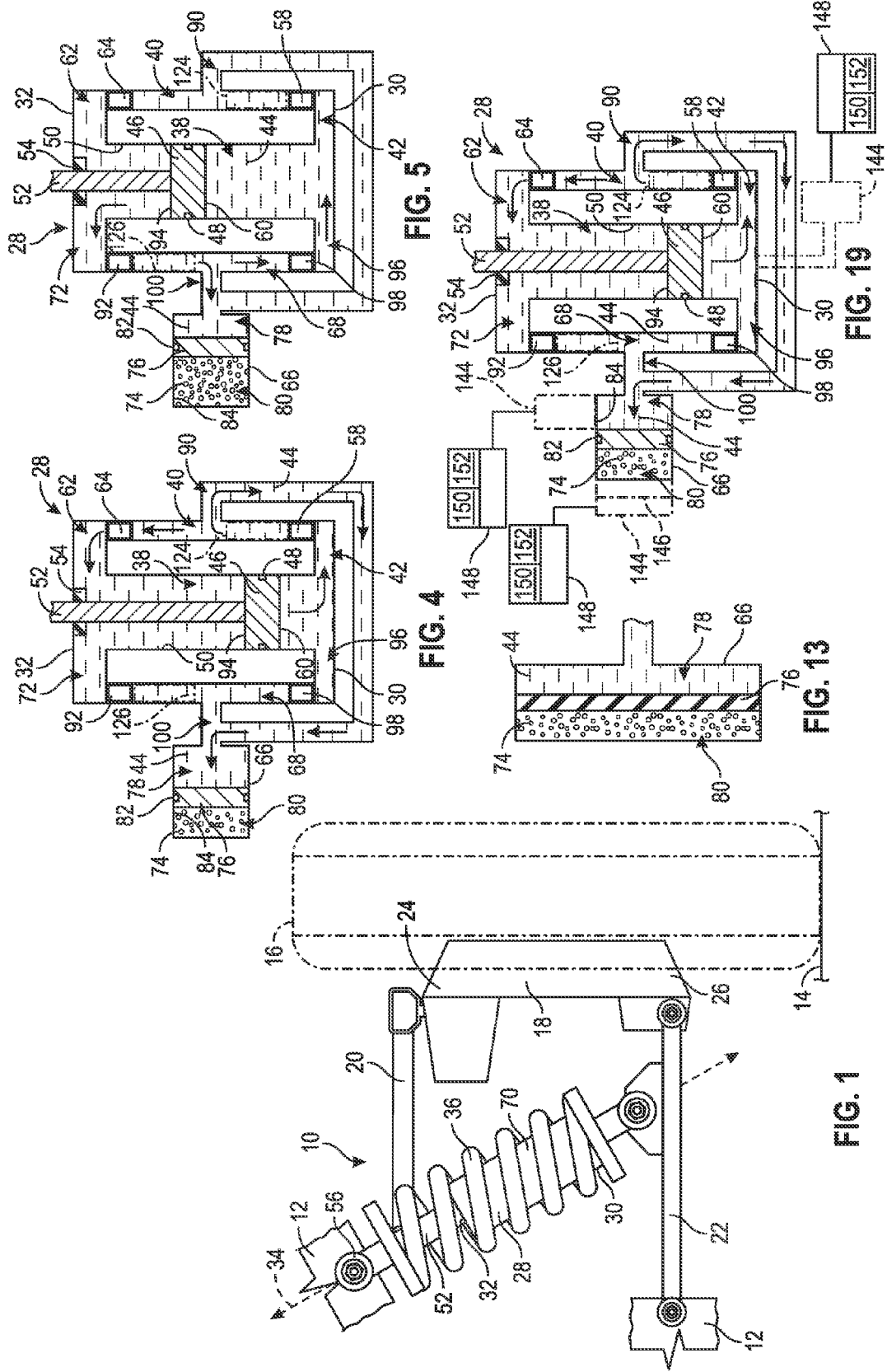
FIG. 1 is a schematic fragmentary side view of a vehicle and a damper assembly coupled to the vehicle.

Referring to the Figures, wherein like numerals indicate like or corresponding parts throughout the several views, a damper assembly 10 is generally shown in FIG. 1. The damper assembly 10 can be utilized with a vehicle or a non-vehicle. Non-limiting examples of the damper assembly 10 being utilized with the vehicle can include an automotive vehicle, such as, a car, a sports car, a truck, a motorcycle, etc. Furthermore, the vehicle can be a hybrid vehicle utilizing an internal combustion engine and one or more motor-generators. Additionally, the vehicle can be an electric vehicle utilizing one or more motor-generators and eliminating the internal combustion engine. As another example, the vehicle can be a vehicle utilizing the internal combustion engine and eliminating the motor-generator(s). It is to be appreciated that the vehicle can alternatively be a non-automotive vehicle such as boats, etc. Non-limiting examples of the damper assembly 10 being utilized with the non-vehicle can include machines, industrial machines, platforms for test equipment, platforms for other equipment or machines, etc.

Continuing with FIG. 1, the vehicle includes a structure 12. The structure 12 can be one or more of: a chassis, a support structure 12, a frame, a subframe, a body, a brace, a panel, an outer skin, etc. The structure 12 can be any suitable configuration. Additionally, the structure 12 can be any component of a sprung mass of the vehicle, including the body, the frame, the subframe, the chassis, the outer skin, or any load-bearing component which is supported by a suspension system (discussed immediately below).

Furthermore, the damper assembly 10 can be utilized with the suspension system. Generally, the suspension system can dampen movement of the structure 12 as the vehicle travels over a road 14 (see FIG. 1) or the ground to provide a smoother ride. The suspension system supports the structure 12 and the structure 12 is spaced from the road 14. The suspension system can also dissipate energy and dampen movement of the unsprung mass. Examples of the unsprung mass can be wheels 16, tires, brakes, etc.

The suspension system can include the damper assembly 10 or a plurality of damper assemblies 10 to dampen movement of the structure 12. The damper assembly 10 can dissipate energy from travelling over the road 14 without causing excess transmission of energy to the structure 12, which thus, provides a smoother ride for the vehicle occupants. Various configurations of the damper assembly 10 are discussed below, and it is to be appreciated that one or more of the damper assemblies 10 described below can be utilized with the suspension system.

Continuing with FIG. 1, the vehicle can include a wheel 16 rotatably supported by a knuckle 18 or a hub. The wheel 16 is shown in phantom lines for illustrative purposes only. The knuckle 18 can be coupled to the structure 12 by at least one link. For example, in certain embodiments, the knuckle 18 is coupled to the structure 12 by a first link 20 and a second link 22. Generally, the first link 20 is coupled to an upper portion 24 of the knuckle 18 and the second link 22 is coupled to a lower portion 26 of the knuckle 18.

In certain embodiments, the damper assembly 10 can be coupled or attached to the second link 22 and coupled or attached to the structure 12. The damper assembly 10 and the first and second links 20, 22 can cooperate with the structure 12 in various orientations, some of which can be referred to as a short long arm (SLA) suspension, a solid axle suspension, a multi-link suspension, struts, or any suitable suspension system arrangement. Therefore, the damper assembly 10 can be coupled or attached to the knuckle 18 and the structure 12 in suspension arrangements such as the SLA suspension, the solid axle suspension, the multi-link suspension, struts, etc.

In one of these alternative suspension arrangements, the suspension system can include a tower mount coupled or attached to the structure 12, and the damper assembly 10 is coupled or attached to the tower mount and the upper portion 24 of the knuckle 18. In this alternative arrangement, the first link 20 can be eliminated.

Generally, the damper assembly 10 is packaged between the wheel 16 and the structure 12 of the vehicle. The features of the damper assembly 10 are configured to provide compact packaging of the damper assembly 10 to minimize the space utilized between the wheel 16 and the structure 12.

Figure 11:
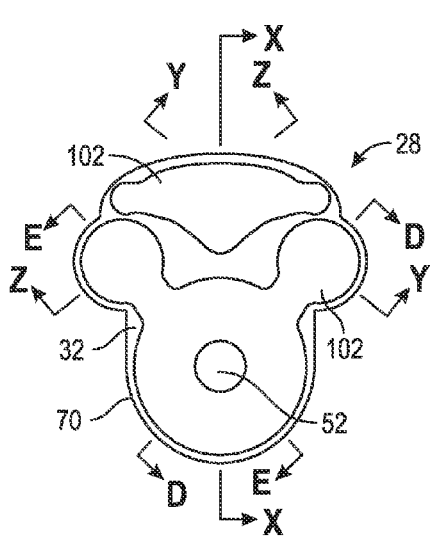
FIG. 11 is a schematic end view of the damper assembly of another configuration.
Figure 12:
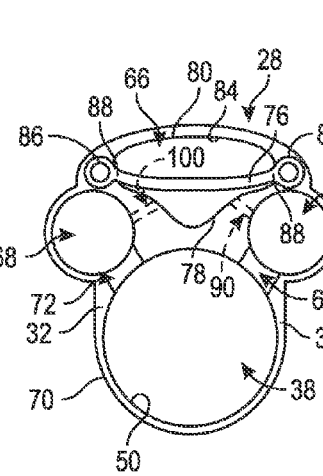
FIG. 12 is a schematic end view of the housing of the damper assembly of FIG. 11 with the components that close the housing removed and the components inside the housing removed except for a member.
Figure 14:
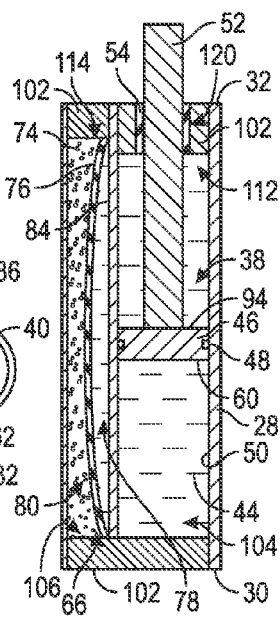
FIG. 14 is a schematic cross-sectional view of the damper assembly taken from lines X-X of FIG. 11.

Referring to FIGS. 1-3, 11 and 12, the damper assembly 10 includes a housing 28. The housing 28 is configured to minimize the space utilized between the wheel 16 and the structure 12. FIGS. 2 and 3 illustrate one configuration of the housing 28 and FIGS. 11 and 12 illustrate another configuration of the housing 28. It is to be appreciated that the housing 28 can be other configurations than illustrated. Furthermore, the housing 28 can be orientated in various different ways and FIG. 1 is one example.

Referring to FIG. 1, the housing 28 can include a first distal end 30 and a second distal end 32 spaced from each other along an axis 34. In certain embodiments, the housing 28 is orientated such that the first distal end 30 is disposed proximal to the second link 22 (as shown in FIG. 1). In other embodiments, the housing 28 is orientated such that the second distal end 32 is disposed proximal to the second link 22. In other words, the orientation of the housing 28 can be reversed. In yet other embodiments, the housing 28 can be orientated such that the first distal end 30 or the second distal end 32 is coupled or attached to the upper portion 24 of the knuckle 18.

The damper assembly 10 can optionally include a coil spring 36 (see FIG. 1). The coil spring 36 can be in any suitable location when utilized. The coil spring 36 can surround the housing 28 in certain embodiments, and FIG. 1 illustrates one example of that. In other configurations, the coil spring 36 does not surround the housing 28.

Referring to FIGS. 3-5 and 12, the housing 28 defines a first chamber 38 and a first passage 40 spaced from each other. Generally, the first chamber 38 and the first passage 40 are substantially parallel to each other in a non-concentric orientation. In other words, the first chamber 38 and the first passage 40 are not concentric to each other. Having the first chamber 38 and the first passage 40 being substantially parallel to each other allows the housing 28 to be formed of extruded aluminum in a cost effective way. It is to be appreciated that the housing 28 can be formed of materials other than aluminum, and non-limiting examples can include steel, polymers, plastic, composites, etc.

As best shown in FIGS. 3-5 and 9, the housing 28 also defines a first inlet 42 that fluidly connects the first chamber 38 and the first passage 40. Generally, the first inlet 42 extends between the first chamber 38 and the first passage 40. Therefore, the first inlet 42 is disposed transverse to the first chamber 38 and the first passage 40.

The first chamber 38, the first passage 40 and the first inlet 42 are each configured to contain a liquid 44. Generally, the liquid 44 is a non-compressible fluid. For example, the liquid 44 can be oil; mineral oil; silicon based fluid; a smart fluid, such as an electrorheological (ER) fluid, magnetorheological (MR) fluid, etc.; hydraulic oil; hydraulic fluid; any suitable shock oil as known to those skilled in the art; etc.

Referring to FIGS. 4-6 and 14, the damper assembly 10 further includes a piston 46 disposed in the first chamber 38. The piston 46 is movable in a first direction and a second direction opposite the first direction. The piston 46 displaces the liquid 44 during movement in the first and second directions. Movement of the piston 46 in the first direction can be toward the first distal end 30 of the housing 28 (see FIG. 4) and movement of the piston 46 in the second direction can be toward the second distal end 32 of the housing 28 (see FIG. 5). In other embodiments, the first direction can be toward the second distal end 32 and the second direction can be toward the first distal end 30 depending on the orientation of various components of the damper assembly 10. Generally, when the piston 46 moves in the first direction, this can be referred to as compression of the damper assembly 10, and when the piston 46 moves in the second direction, this can be referred to as rebound of the damper assembly 10.

Optionally, a first seal 48 can be disposed between the piston 46 and an inner wall 50 of the first chamber 38 to minimize the liquid 44 from moving therebetween as the piston 46 moves. Furthermore, optionally, the piston 46 can include one or more valves, or define one or more orifices, that allow a small amount of the liquid 44 to flow therethrough as the piston 46 moves in the first and second directions.

Continuing with FIGS. 4-6 and 14, the damper assembly 10 can also include a rod 52 extending from the piston 46. The rod 52 can be partially disposed inside the first chamber 38 and partially disposed outside of the first chamber 38. The rod 52 and the piston 46 can be attached to each other or integrally formed as a one-piece unit. Therefore, the rod 52 and the piston 46 move in unison or simultaneously.

The damper assembly 10 can further include a rod seal 54 disposed about the rod 52. In other words, the rod seal 54 surrounds the rod 52. The rod seal 54 is coupled to the housing 28 to maintain the position of the rod seal 54 relative to the housing 28 as the rod 52 moves with the piston 46. Generally, the rod 52 moves relative to the rod seal 54. The rod seal 54 prevents the liquid 44 from leaking out between the housing 28 and the rod 52. Pressure and friction is applied to the rod seal 54 as the rod 52 and the piston 46 moves in the first and second directions. The configuration of the damper assembly 10 reduces the amount of pressure and friction applied to the rod seal 54, which is discussed further below.

Turning back to FIG. 1, the rod 52 can include a first connector end 56 coupled or attached to the structure 12, or coupled or attached to the second link 22 depending on the orientation of the piston 46 and the rod 52 relative to the structure 12. Therefore, in various embodiments, the first connector end 56 is attached or coupled to the structure 12, and in other embodiments, the first connector end 56 is attached or coupled to the second link 22. In yet other embodiments, the first connector end 56 can be attached or coupled to other components of the suspension system depending on the suspension arrangement being utilized. As identified above, the structure 12 can include many different components, and the first connector end 56 of the rod 52 can be coupled or attached to any suitable component of the structure 12. It is to be appreciated that the first connector end 56 of the rod 52 can be coupled or attached to the structure 12, the second link 22, etc., by any suitable methods, such as fasteners (as shown in FIG. 1 for illustrative purposes only), couplers, pins, etc.

Generally, the first connector end 56 of the rod 52 is spaced from the piston 46 and disposed outside of the housing 28. It is to be appreciated that a dust cover or an external tube can surround the rod 52, the first connector end 56 of the rod 52 and/or the housing 28, but for illustrative purposes, is not shown in the Figures.

Turning to FIGS. 4, 5, 7, 9, 15 and 17, the damper assembly 10 also includes a first restrictor valve 58 disposed in the first passage 40. The first restrictor valve 58 is configured to restrict a flow of the liquid 44 into the first passage 40 from the first chamber 38 and the first inlet 42 as the piston 46 moves in one of the first and second directions which causes the liquid 44 in the first chamber 38 to increase a pressure applied to a first side 60 of the piston 46 to dampen movement of the piston 46. For example, the first restrictor valve 58 can restrict the flow of the liquid 44 into the first passage 40 from the first chamber 38 when the piston 46 moves in the first direction, i.e., compression. In certain embodiments, the first side 60 of the piston 46 can face the first distal end 30 of the housing 28. Dampening movement of the piston 46 correspondingly dampens movement of the structure 12 which provides a smoother ride along the road 14. The first restrictor valve 58 can also be referred to as a metering valve or a regulating valve. Furthermore, the first restrictor valve 58 can be an adaptive valve or passive valve. Non-limiting examples of the adaptive valve can include a solenoid valve, a magnetorheological (MR) valve, an electrorheological (ER) valve. A non-limiting example of the passive valve is the valve defines an orifice and includes a pre-loaded spring blow-off element(s).

Referring to FIGS. 3-5, 9 and 12, the housing 28 can define a first outlet 62 that fluidly connects the first chamber 38 and the first passage 40. Generally, the first outlet 62 extends between the first chamber 38 and the first passage 40. Therefore, the first outlet 62 is disposed transverse to the first chamber 38 and the first passage 40. The first outlet 62 is configured to contain the liquid 44. The first passage 40 is fluidly connected to the first chamber 38 in two locations, i.e., through the first inlet 42 and the first outlet 62. Generally, the first inlet 42 and the first outlet 62 are spaced from each other. For example, the first inlet 42 can be disposed proximal to the first distal end 30 of the housing 28 and the first outlet 62 can be disposed proximal to the second distal end 32 of the housing 28. In certain situations, which will be discussed further below, some of the liquid 44 enters the first passage 40 through the first inlet 42 and exits the first passage 40 through the first outlet 62.

Referring to FIGS. 4, 5, 7, 9, 15 and 17, the damper assembly 10 can further include a first one-way valve 64 disposed in the first passage 40. Generally, the first one-way valve 64 allows the flow of liquid 44 in one direction and prevents the flow of the liquid 44 in an opposite direction. Therefore, the first one-way valve 64 is disposed in the first passage 40 to prevent the flow of the liquid 44 into the first passage 40 from the first outlet 62. Specifically, the first one-way valve 64 can be disposed in the first passage 40 to allow the liquid 44 to exit the first passage 40 through the first one-way valve 64 while preventing the liquid 44 from flowing into the first passage 40 from the first outlet 62. Therefore, once the liquid 44 exits the first one-way valve 64 to the first outlet 62, the liquid 44 cannot enter the first one-way valve 64 from the first outlet 62. In certain embodiments, the first restrictor valve 58 can be disposed proximal to the first inlet 42 and the first one-way valve 64 can be disposed proximal to the first outlet 62. The first one-way valve 64 can also be referred to as a check valve.

Referring to FIGS. 3 and 12, the housing 28 can define a second chamber 66 and a second passage 68 spaced from each other. The second chamber 66 accommodates for thermal expansion of the liquid 44 as the piston 46 moves in the first and second directions. As the piston 46 displaces the liquid 44 during movement, heat is created which causes thermal expansion of the liquid 44, and the second chamber 66 accommodates this thermal expansion. Optionally, an outer wall 70 of the housing 28 can include a plurality of fins spaced from each other for cooling purposes or heat transfer purposes.

Generally, the second chamber 66 and the second passage 68 are substantially parallel to each other in a non-concentric orientation. In other words, the second chamber 66 and the second passage 68 are not concentric to each other. Having the second chamber 66 and the second passage 68 being substantially parallel to each other allows the housing 28 to be formed of extruded aluminum in a cost effective way. The schematic circuit illustration of the second chamber 66 in FIG. 13 can replace the second chamber 66 illustrated in FIGS. 4 and 5.

Furthermore, in certain embodiments, as shown in FIGS. 3 and 12, the first and second chambers 38, 66 and the first and second passages 40, 68 are substantially parallel to each other in a non-concentric orientation. In other words, the first and second chambers 38, 66 and the first and second passages 40, 68 are not concentric to each other. Having the first and second chambers 38, 66 and the first and second passages 40, 68 being substantially parallel to each other allows the housing 28 to be formed of extruded aluminum in a cost effective way.

Furthermore, referring to FIGS. 3-5, 10 and 12, the housing 28 can define a second inlet 72 that fluidly connects the first chamber 38 and the second passage 68. Generally, the second inlet 72 extends between the first chamber 38 and the second passage 68. Therefore, the second inlet 72 is disposed transverse to the first chamber 38 and the second passage 68. The second chamber 66, the second passage 68 and the second inlet 72 are each configured to contain the liquid 44.

Referring to FIGS. 4-6, 13 and 14, the second chamber 66 is also configured to contain a gaseous fluid 74. The second chamber 66 is split into a liquid fluid side which contains some of the liquid 44 and a gaseous fluid side which contains the gaseous fluid 74. The gaseous fluid 74 can be an inert gaseous fluid 74, air, nitrogen, any other suitable gaseous fluid 74, etc.

Turning to FIGS. 4-8 and 12-18, the damper assembly 10 can further include a member 76 disposed in the second chamber 66. The member 76 is at least partially movable in the second chamber 66 as the piston 46 moves in the first and second directions. The member 76 moves in response to pressure applied thereto due to movement of the piston 46 between the first and second directions. Generally, the member 76 moves to further compress the gaseous fluid 74 when the piston 46 moves in the first direction (see FIG. 4) and the member 76 moves in the opposite direction to decompress the gaseous fluid 74 when the piston 46 moves in the second direction (see FIG. 5).

The member 76 splits the second chamber 66 into a first cavity 78 and a second cavity 80. The first cavity 78 is configured to contain some of the liquid 44 and the second cavity 80 is configured to contain the gaseous fluid 74. Therefore, the liquid fluid side is the first cavity 78 and the gaseous fluid side is the second cavity 80. The member 76 can be various configurations and a couple different examples are discussed below for illustrative purposes only. It is to be appreciated that the member 76 can be other configurations than discussed herein.

In certain embodiments, as shown in FIGS. 4-8, the member 76 is formed of a rigid material such that the member 76 substantially maintains its configuration. The entire member 76 of this embodiment can be movable in the second chamber 66 in response to movement of the piston 46 in the first chamber 38. Optionally, a second seal 82 can be disposed between the member 76 and an inner wall 84 of the second chamber 66 to minimize leaking of the liquid 44 and the gaseous fluid 74 therebetween. In other words, the second seal 82 about the member 76 assist in maintaining the liquid 44 in the first cavity 78 and the gaseous fluid 74 in the second cavity 80, i.e., minimizes mixing of the liquid and gaseous fluid 44, 74. This member 76 can be a referred to as a floating piston 46 or cup.

In other embodiments, as shown in FIGS. 12-18, the member 76 is at least partially formed of a flexible material such that at least part of the member 76 can be movable in the second chamber 66 in response to movement of the piston 46 in the first chamber 38. This member 76 can be referred to as a membrane or non-permeable membrane to maintain separation between the gaseous fluid 74 and the liquid 44.

The member 76 of FIGS. 12-18 can also include a plurality of anchors 86 spaced from each other. One anchor 86 is disposed proximal to one edge 88 of the member 76 and another anchor 86 is disposed proximal to another edge 88 of the member 76. The anchors 86 secure the member 76 to the inside of the second chamber 66 such that a portion of the member 76 can remain stationary as another portion of the member 76 moves in response to the movement of the piston 46 in the first chamber 38. The anchors 86 can be any suitable configuration and FIG. 12 illustrates one example with the anchors 86 surrounded by the flexible material. The anchors 86 can be a rigid material. For example, the anchors 86 can be wire, hard plastic, etc.

Referring to FIGS. 3-5, 7, 12 and 15, the housing 28 can define a first pathway 90 disposed between the first restrictor valve 58 and the first one-way valve 64 to fluidly connect the first passage 40 and the second chamber 66. Generally, the first pathway 90 extends between the second chamber 66 and the first passage 40. Therefore, the first pathway 90 is disposed transverse to the second chamber 66 and the first passage 40. The first pathway 90 is also configured to contain the liquid 44.

Turning to FIGS. 4, 5, 8, 10, 16 and 18, the damper assembly 10 can further include a second restrictor valve 92 disposed in the second passage 68. The second restrictor valve 92 is configured to restrict the flow of the liquid 44 into the second passage 68 as the piston 46 moves in the other one of the first and second directions which causes the liquid 44 in the first chamber 38 to increase a pressure applied to a second side 94 of the piston 46 to dampen movement of the piston 46. For example, the second restrictor valve 92 can restrict the flow of the liquid 44 into the second passage 68 from the first chamber 38 when the piston 46 moves in the second direction, i.e., rebound. In certain embodiments, the second side 94 of the piston 46 can face the second distal end 32 of the housing 28. Dampening movement of the piston 46 correspondingly dampens movement of the structure 12 which provides a smoother ride along the road 14. The second restrictor valve 92 can be referred to as a metering valve or a regulating valve. Furthermore, the second restrictor valve 92 can be an adaptive valve or passive valve. Non-limiting examples of the adaptive valve of the second restrictor valve 92 can include a solenoid valve, a magnetorheological (MR) valve, an electrorheological (ER) valve. A non-limiting example of the passive valve of the second restrictor valve 92 is the valve defines an orifice and includes a pre-loaded spring blow-off element(s).

Referring to FIGS. 4, 5 and 10, the housing 28 can define a second outlet 96 that fluidly connects the first chamber 38 and the second passage 68. Generally, the second outlet 96 extends between the first chamber 38 and the second passage 68. Therefore, the second outlet 96 is disposed transverse to the first chamber 38 and the second passage 68. The second outlet 96 is configured to contain the liquid 44. The second passage 68 is fluidly connected to the first chamber 38 in two locations, i.e., through the second inlet 72 and the second outlet 96. Generally, the second inlet 72 and the second outlet 96 are spaced from each other. For example, the second inlet 72 can be disposed proximal to the second distal end 32 of the housing 28 and the second outlet 96 can be disposed proximal to the first distal end 30 of the housing 28. In certain situations, which will be discussed further below, some of the liquid 44 enters the second passage 68 through the second inlet 72 and exits the second passage 68 through the second outlet 96.

Turning to FIGS. 4, 5, 8, 10, 16 and 18, the damper assembly 10 can also include a second one-way valve 98 disposed in the second passage 68. Generally, the second one-way valve 98 allows the flow of liquid 44 in one direction and prevents the flow of the liquid 44 in an opposite direction. Therefore, the second one-way valve 98 is disposed in the second passage 68 to prevent the flow of the liquid 44 into the second passage 68 from the second outlet 96. Specifically, the second one-way valve 98 can be disposed in the first passage 40 to allow the liquid 44 to exit the second passage 68 through the second one-way valve 98 while preventing the liquid 44 from flowing into the second passage 68 from the second outlet 96. Therefore, once the liquid 44 exits the second one-way valve 98 to the second outlet 96, the liquid 44 cannot enter the second one-way valve 98 from the second outlet 96. In certain embodiments, the second restrictor valve 92 can be disposed proximal to the second inlet 72 and the second one-way valve 98 can be disposed proximal to the second outlet 96. The second one-way valve 98 can also be referred to as a check valve.

Referring to FIGS. 3-5, 8, 12 and 16, the housing 28 can also define a second pathway 100 disposed between the second restrictor valve 92 and the second one-way valve 98 to fluidly connect the second passage 68 and the second chamber 66. Generally, the second pathway 100 extends between the second chamber 66 and the second passage 68. Therefore, the second pathway 100 is disposed transverse to the second chamber 66 and the second passage 68. The second pathway 100 is also configured to contain the liquid 44.

Turning to FIGS. 2, 6-11 and 14-18, the housing 28 can include a plurality of caps 102 to close the first and second chambers 38, 66 of the housing 28 and the first and second passages 40, 68 of the housing 28. The caps 102 can assist in improving the assembly process of the damper assembly 10. Any suitable number of caps 102 can be utilized and some examples are discussed below.

For example, in certain embodiments, one of the caps 102 can be defined as a first cap 102 that can be utilized to close a first end 104 of the first chamber 38. Furthermore, in certain embodiments, the first cap 102 can close a first end 106 of the second chamber 66. Additionally, in certain embodiments, the first cap 102 can close a first end 108 of the first passage 40 and a first end 110 of the second passage 68. As shown in FIGS. 9 and 10, one of the caps 102, such as the first cap 102, can define a portion of the first inlet 42 and a portion of the second outlet 96, which can make the assembly process more efficient.

Alternatively, the first cap 102 can close the first ends 104, 106 of the first and second chambers 38, 66, another cap 102 can close the first end 108 of the first passage 40 and yet another cap 102 can close the first end 110 of the second passage 68. As another alternative, one cap 102 can close the first end 104 of the first chamber 38, another cap 102 can close the first end 106 of the second chamber 66, yet another cap 102 can close the first end 108 of the first passage 40 and another cap 102 can close the first end 110 of the second passage 68. As yet another alternative, one cap 102 can be utilized for one or more of the first ends 104, 106 of the first and second chambers 38, 66, and another cap 102 can be utilized for one or more of the first ends 108, 110 of the first and second passages 40, 68. Any other combination of caps 102 cooperating with the first ends 104, 106, 108, 110 of the chambers 38, 66/passages 40, 68 can be utilized.

As another example, in certain embodiments, one of the caps 102 can be defined as a second cap 102 that can be utilized to close a second end 112 of the first chamber 38. Furthermore, in certain embodiments, the second cap 102 can close a second end 114 of the second chamber 66. Additionally, in certain embodiments, the second cap 102 can close a second end 116 of the first passage 40 and a second end 118 of the second passage 68. The second cap 102 that closes the second end 112 of the first chamber 38 can define an opening 120 for the rod 52 of the piston 46 to extend therethrough. Furthermore, the rod seal 54 is disposed in the opening 120 to minimizing leaking of the liquid 44 out of the opening 120. As shown in FIGS. 9 and 10, one of the caps 102, such as the second cap 102, can define a portion of the first outlet 62 and a portion of the second inlet 72, which can make the assembly process more efficient. For example, a minimum of two caps 102 can be utilized with the housing 28 of FIGS. 11 and 12.

Alternatively, the second cap 102 can close the second ends 112, 114 of the first and second chambers 38, 66, another cap 102 can close the second end 116 of the first passage 40 and yet another cap 102 can close the second end 118 of the second passage 68. As another alternative, one cap 102 can close the second end 112 of the first chamber 38, another cap 102 can close the second end 114 of the second chamber 66, yet another cap 102 can close the second end 116 of the first passage 40 and another cap 102 can close the second end 118 of the second passage 68. As yet another alternative, one cap 102 can be utilized for one or more of the second ends 112, 114 of the first and second chambers 38, 66, and another cap 102 can be utilized for one or more of the second ends 116, 118 of the first and second passages 40, 68. Any other combination of caps 102 cooperating with the second ends 112, 114, 116, 118 of the chambers 38, 66/passages 40, 68 can be utilized.

In certain embodiments, one of the caps 102 can be defined as a third cap 102 that can be utilized to close the second end 114 of the second chamber 66. Therefore, in various embodiments, the second cap 102 can close at least the second end 112 of the first chamber 38 and the third cap 102 can close the second end 114 of the second chamber 66. For example, a minimum of three caps 102 can be utilized with the housing 28 of FIGS. 2 and 3.

In various embodiments, one of the caps 102 can include a second connector end 122 (see FIGS. 9 and 10) which couples the first distal end 30 of the housing 28 to the structure 12, the second link 22 or any other component depending on the configuration of the suspension system discussed above. Any of the caps 102 can include the second connector end 122 depending on the configuration or orientation of the suspension system. By incorporating the second connector end 122 into one of the caps 102, this can reduce the number of assembly parts and reduce assembly time. The second connector end 122 can include an eye ring or clevis, etc.

Referring to FIGS. 15-18, one or more of the caps 102 can be configured to wedge or pinch a portion of the member 76 between a wall of the housing 28 in the second chamber 66 and that cap 102. Generally, these configurations of the caps 102 cooperate with the membrane configuration of the member 76 and ensure a desired preload is applied to the member 76. The caps 102 can include a tapered portion, a flat portion or any other suitable configuration to wedge or pinch the member 76 between the wall of the housing 28 in the second chamber 66 and that cap 102.

The damper assembly 10 features discussed above can be for a passive suspension system. Passive suspension systems do not allow the spring rate or the preload of the damper assembly 10 to be variable during operation of the vehicle. Furthermore, passive suspension systems do not allow the amount of damping of the damper assembly 10 to be variable during operation of the vehicle. Therefore, once the desired amount of damping is determined and the components assembled according to the desired amount of damping, the damper assembly 10 will dampen movement of the sprung mass according to that pre-set amount.

The operation of the passive damper assembly 10 will be briefly discussed below for illustrative purposes. When the vehicle travels over, for example, a bump, the suspension system reacts to dampen movement of the vehicle to provide a smooth ride. Specifically, the damper assembly 10 will react to dampen movement of the vehicle. The location of the first passage 40 having the first restrictor and one-way valves 58, 64 disposed therein and location of the second passage 68 having the second restrictor and one-way valves 92, 98 disposed therein allows for independent control of the piston 46, as the piston 46 moves in the first and second directions. The configuration and location of the valves 58, 64, 92, 98 also provides the ability to check the valves 58, 64, 92, 98 off-line and/or calibrate the valves 58, 64, 92, 98 prior to assembling all of the components of the damper assembly 10.

The piston 46 of the damper assembly 10 will move back and forth in the housing 28 in response to the bump. Referring to FIG. 4, when the piston 46 moves in the first direction, i.e., compression, which is toward the first distal end 30 of the housing 28, the liquid 44 is displaced and some of this liquid 44 is forced through the first restrictor valve 58 and into the first passage 40. The displaced liquid 44 can either continue through the first pathway 90 into the second chamber 66 or out of the first one-way valve 64. The arrows in FIG. 4 illustrate the paths of flow of the displaced liquid 44 when the piston 46 moves in the first direction. As the liquid 44 enters the second chamber 66, the member 76 moves to compress the gaseous fluid 74, as the second chamber 66 accommodates for thermal expansion due to the movement of the piston 46. When the piston 46 moves in the first direction, the liquid 44 is not displaced into the second passage 68. As such, the operation of the damper assembly 10, when the piston 46 moves in the first direction, occurs with the first restrictor valve 58 and the first one-way valve 64. The first restrictor valve 58 provides a pressure drop from the first chamber 38 to the first passage 40 which reduces a gas charge applied to the second chamber 66. Reducing the gas charge in turn reduces the amount of pressure and friction applied to the rod seal 54.

Referring to FIG. 5, when the piston 46 moves in the second direction, i.e., rebound, which is toward the second distal end 32 of the housing 28, the liquid 44 is displaced and some of this liquid 44 is forced through the second restrictor valve 92 and into the second passage 68. The displaced liquid 44 can either continue through the second pathway 100 into the second chamber 66 or out of the second one-way valve 98. The arrows in FIG. 5 illustrate the paths of flow of the displaced liquid 44 when the piston 46 moves in the second direction. Less liquid 44 enters the second chamber 66 when the piston 46 moves in the second direction which allows the member 76 to move to decompress the gaseous fluid 74. When the piston 46 moves in the second direction, the liquid 44 is not displaced into the first passage 40. As such, the operation of the damper assembly 10, when the piston 46 moves in the second direction, occurs with the second restrictor valve 92 and the second one-way valve 98. The second restrictor valve 92 provides a pressure drop from the first chamber 38 to the second passage 68 which reduces the gas charge applied to the second chamber 66. Reducing the gas charge in turn reduces the amount of pressure and friction applied to the rod seal 54.

The damper assembly 10 can further include features that allow the damping of the vehicle to be variable. For example, the damper assembly 10 discussed above can include other features that cause the damper assembly 10 to be for an adaptive suspension system instead of the passive suspension system. Adaptive suspension systems allow the amount of damping of the sprung mass of the vehicle to be varied. However, adaptive suspension systems do not allow the spring rate or the preload of the damper assembly 10 to be variable during operation of the vehicle. The features of the adaptive suspension system are discussed immediately below.

Figure 17:
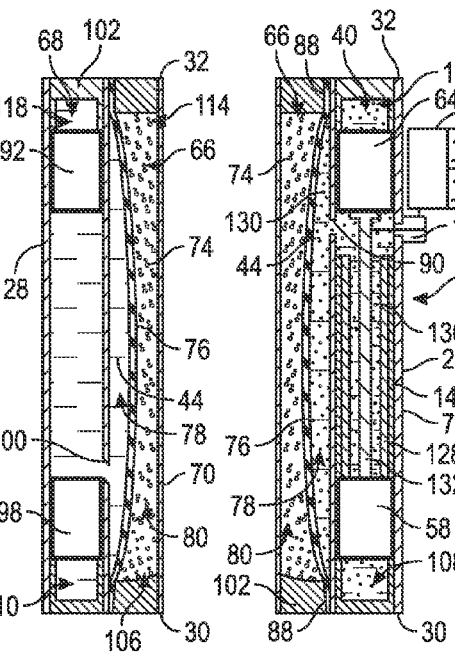
FIG. 17 is a schematic cross-sectional view of the damper assembly including a first electrorheological valve in a de-energized state, which can be similarly taken from lines Y-Y of FIG. 11.

Optionally, in certain embodiments, as shown in FIG. 17, the damper assembly 10 can include a first electrorheological (ER) valve 124 disposed in the first passage 40 between the first restrictor valve 58 and the first one-way valve 64. The first ER valve 124 is also shown in phantom lines in FIGS. 4, 5, 9 and 19 for illustrative purposes as an optional feature for the damper assembly 10. Therefore, the first ER valve 124 can be utilized in any of the embodiments described herein. The phantom lines generally indicate where the first ER valve 124 could be located. The first ER valve 124 is selectively energized to selectively restrict the flow of the liquid 44 through the first passage 40 which causes the liquid 44 in the first chamber 38 to increase the pressure applied to the first side 60 of the piston 46 to dampen movement of the piston 46. Therefore, the first ER valve 124 can be in an energized state or a de-energized state.

Figure 18:
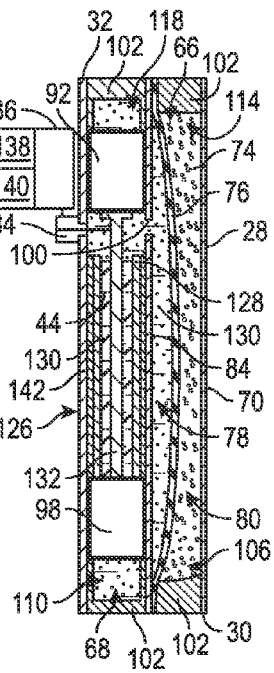
FIG. 18 is a schematic cross-sectional view of the damper assembly including a second electrorheological valve in an energized state, which can be similarly taken from lines Z-Z of FIG. 11.

Optionally, in certain embodiments, as shown in FIG. 18, the damper assembly 10 can further include a second electrorheological (ER) valve 126 disposed in the second passage 68 between the second restrictor valve 92 and the second one-way valve 98. The second ER valve 126 is also shown in phantom lines in FIGS. 4, 5, 10 and 19 for illustrative purposes as an optional feature for the damper assembly 10. Therefore, the second ER valve 126 can be utilized in any of the embodiments described herein. The phantom lines generally indicate where the second ER valve 126 could be located. The second ER valve 126 is selectively energized to selectively restrict the flow of the liquid 44 through the second passage 68 which causes the liquid 44 in the first chamber 38 to increase the pressure applied to the second side 94 of the piston 46 to dampen movement of the piston 46. Therefore, the second ER valve 126 can be in an energized state or a de-energized state.

Referring to FIGS. 17 and 18, the first and second ER valves 124, 126 can each include a casing 128 containing the liquid 44 that has properties the can change the shear strength of the liquid 44 in certain situations, i.e., can be referred to as the smart liquid 44. The first and second ER valves 124, 126 can each include a plurality of particles 130 contained in the casing 128. The particles 130 are disposed in the liquid 44, and therefore, located in the same places where the liquid 44 is located in the housing 28, e.g., the first chamber 38, the liquid fluid side of the second chamber 66, the first passage 40, the second passage 68, etc. For example, the particles 130 can be formed of a polymer and one suitable polymer is plastic. The smart liquid 44 can be a silicone based fluid or any other suitable type of smart liquid 44.

Continuing with FIGS. 17 and 18, the first and second ER valves 124, 126 can each include an electrode 132 that can create an electric field when a current is applied to the electrode 132. The casing 128 at least partially surrounds the electrode 132. In other words, the electrode 132 is at least partially disposed inside the casing 128. When the electric field is created, the particles 130 and the smart liquid 44 interact to change the shear strength of the smart liquid 44 within the casing 128.

When the first and second ER valves 124, 126 are energized, the electrode 132 creates the electric field and the shear strength of the smart liquid 44 increases, which increases the resistance on the liquid 44 traveling through the first and second ER valves 124, 126, which thus restricts the flow of the liquid 44. Therefore, when the first ER valve 124 is energized, the flow of the liquid 44 into the first passage 40 is restricted, and when the second ER valve 126 is energized, the flow of the liquid 44 into the second passage 68 is restricted. FIG. 18 illustrates when the electric field is being created and the particles 130 are organized generally in rows or chains between the electrode 132 and the casing 128 of respective ER valves 124, 126, i.e., the energized state.

When the first and second ER valves 124, 126 are de-energized, the electrode 132 does not create the electric field and the shear strength of the smart liquid 44 decreases, which creates less resistance on the liquid 44 traveling through the first and second ER valves 124, 126. Therefore, when the first ER valve 124 is de-energized, the flow of the liquid 44 into the first passage 40 is less restricted than when the valve 124 is energized, and when the second ER valve 126 is de-energized, the flow of the liquid 44 into the second passage 68 is less restricted than when the valve 126 is energized. FIG. 17 illustrates when no electric field is being created and the particles 130 are unorganized in the smart liquid 44, i.e., the de-energized state.

Referring to FIGS. 17 and 18, the first and second ER valves 124, 126 can each include a power source 134 that is electrically connected to respective electrodes 132 to selective energize the respective electrode 132. The cross-sectional views of FIGS. 17 and 18 can be similarly taken from FIG. 11 with the addition of respective power sources 134 being coupled to the outside of the housing 28, which is not shown in FIG. 11. Therefore, FIG. 11 is illustrative of the damper assembly 10 that can be utilized without the first and second ER valves 124, 126, and is illustrative of the damper assembly 10 that can utilize the first and second ER valves 124, 126.

Referring to FIGS. 17 and 18, a controller 136 can be in communication with the power source 134 of the first and second ER valves 124, 126 to selectively energize respective electrodes 132. It is to be appreciated that a plurality of controllers 136 can be utilized. For example, one controller 136 can be in communication with the electrode 132 of the first ER valve 124 and another controller 136 can be in communication with the electrode 132 of the second ER valve 126. As another example, one controller 136 can be in communication with the electrode 132 of the first ER valve 124, another controller 136 can be in communication with the electrode 132 of the second ER valve 126 and yet another controller 136 can be in communication with both of the controllers 136. As yet another example, one controller 136 can be in communication with the power source 134 of both the first and second ER valves 124, 126.

The controller(s) 136 can be part of an electronic control module that is in communication with various components of the vehicle. The controller(s) 136 includes a processor 138 and a memory 140 on which is recorded instructions for communicating with the power sources 134 and optionally other components of the vehicle. The controller(s) 136 is configured to execute the instructions from the memory 140, via the processor 138. For example, the controller(s) 136 can be a host machine or distributed system, e.g., a computer such as a digital computer or microcomputer, acting as a vehicle control module having a processor and the memory 140. The memory 140 can be tangible, non-transitory computer-readable memory such as read-only memory (ROM) or flash memory. The controller(s) 136 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller(s) 136 can include all software, hardware, memory 140, algorithms, connections, sensors, etc., necessary to monitor and control the power sources 134, etc. As such, a control method can be embodied as software or firmware associated with the controller(s) 136. It is to be appreciated that the controller(s) 136 can also include any device capable of analyzing data from various sensors, comparing data, making the necessary decisions required to control and monitor the power sources 134, etc.

Continuing with FIGS. 17 and 18, the first and second ER valves 124, 126 can each include an insulator 142 to prevent the electric field from being created in other areas of the damper assembly 10. The insulator 142 can surround the casing 128, as well as the smart liquid 44 and the particles 130 inside the casing 128. Furthermore, the insulator 142 can at least partially surround the electrode 132. The insulator 142 can be formed of any suitable non-conductive material. For example, the insulator 142 can be formed of nylon, etc.

The damper assembly 10 of the adaptive suspension system can include the first and second ER valves 124, 126, and the corresponding features discussed above. Therefore, the damper assembly 10 of the adaptive suspension system includes the first and second restrictor valves 58, 92, the first and second one-way valves 64, 98 and the first and second ER valves 124, 126.

The operation of the adaptive damper assembly 10 will be briefly discussed below for illustrative purposes. The difference between the passive damper assembly 10 and the adaptive damper assembly 10 is the adaptive damper assembly 10 further includes the first and second ER valves 124, 126. Therefore, the adaptive damper assembly 10 includes the piston 46, the first and second restrictor valves 58, 92, the first and second one-way valves 64, 98 and the second chamber 66 as discussed above, and the details of the operation of these components will not be re-discussed. The adaptive system adds the first and second ER valves 124, 126 and the operation with these ER valves 124, 126 will be discussed below.

Referring to FIG. 4, when the piston 46 moves in the first direction, i.e., compression, which is toward the first distal end 30 of the housing 28, the liquid 44 is displaced and some of this liquid 44 is forced through the first restrictor valve 58 and then through the first ER valve 124. The first ER valve 124 can be energized when the piston 46 moves in the first direction. The controller 136 communicates to the power source 134 and the power source 134 supplies the current to the electrode 132 of the first ER valve 124 which energizes that electrode 132 and creates the electric field. The electric field causes the particles 130 inside the first ER valve 124 to align in rows or chains, or become organized, which further restricts the flow of the liquid 44. As the liquid 44 exits the first restrictor valve 58 and the first ER valve 124, the displaced liquid 44 can either continue through the first pathway 90 into the second chamber 66 or out of the first one-way valve 64. When the piston 46 moves in the first direction, the liquid 44 is not displaced into the second passage 68. As such, when the piston 46 moves in the first direction, the second ER valve 126 is de-energized, and thus, the particles 130 inside the second ER valve 126 are unorganized when the second ER valve 126 is de-energized.

Referring to FIG. 5, when the piston 46 moves in the second direction, i.e., rebound, which is toward the second distal end 32 of the housing 28, the liquid 44 is displaced and some of this liquid 44 is forced through the second restrictor valve 92 and then through the second ER valve 126. The second ER valve 126 can be energized when the piston 46 moves in the second direction. The controller 136 communicates to the power source 134 and the power source 134 supplies the current to the electrode 132 of the second ER valve 126 which energizes that electrode 132 and creates the electric field. The electric field causes the particles 130 inside the second ER valve 126 to align in rows or chains, or become organized, which further restricts the flow of the liquid 44. As the liquid 44 exits the second restrictor valve 92 and the second ER valve 126, the displaced liquid 44 can either continue through the second pathway 100 into the second chamber 66 or out of the second one-way valve 98. When the piston 46 moves in the second direction, the liquid 44 is not displaced into the first passage 40. As such, when the piston 46 moves in the second direction, the first ER valve 124 is de-energized, and thus, the particles 130 inside the first ER valve 124 are unorganized when the first ER valve 124 is de-energized.

The damper assembly 10 can further include features that allow the damping, and/or the preload, of the vehicle to be variable and/or controlled. For example, the damper assembly 10 discussed above can include other features that allow the damper assembly 10 to be for an active suspension system instead of the passive or adaptive suspension system. Active suspension systems allow a spring rate or the preload of the damper assembly 10 to be variable during operation of the vehicle. Furthermore, the active suspension systems can allow the height of the structure 12 relative to the road 14 to be changed. Active suspension systems can improve vehicle handling. The features of the active suspension system are discussed immediately below.

Optionally, in certain embodiments, the damper assembly 10 can include an actuator 144 (see FIG. 19) coupled to the second chamber 66. The actuator 144 is shown in phantom lines in the schematic illustration of FIG. 19. The actuator 144 can be utilized to change the spring rate of the suspension system and change the height of the structure 12 relative to the road 14. The actuator 144 can be coupled to the housing 28 in various locations and three different locations are illustrated in FIG. 19. For example, the actuator 144 can be coupled to the gaseous fluid side of the second chamber 66 or the second cavity 80 of the second chamber 66. As another example, the actuator 144 can be coupled to the liquid fluid side of the second chamber 66 or the first cavity 78 of the second chamber 66. As yet another example, the actuator 144 can be coupled to the first chamber 38.

In certain embodiments, the actuator 144 can include a plunger 146 selectively movable in the second chamber 66 to selectively change a pressure applied to the member 76 which changes the spring rate of the piston 46. Furthermore, movement of the plunger 146 can move the member 76 in the second chamber 66. Generally, the plunger 146 can be coupled to the gaseous fluid side of the second chamber 66 or the second cavity 80 of the second chamber 66. The plunger 146 can be movable by a motor or any other suitable device to selectively move the plunger 146. In this embodiment, the amount of liquid 44 in the housing 28 is not changed.

Alternatively, the actuator 144 is coupled to the first chamber 38 and selectively actuated to change an amount of the liquid 44 in the first chamber 38 which changes the spring rate of the piston 46. Therefore, in this embodiment, the amount of liquid 44 in the housing 28 is changed. Meaning, the amount of the liquid 44 disposed in the housing 28 can be increased or decreased. In this embodiment, the plunger 146 of the actuator 144 is eliminated.

Yet another alternative, the actuator 144 is coupled to the liquid fluid side of the second chamber 66 or the first cavity 78 of the second chamber 66 and selectively actuated to change an amount of the liquid 44 in the second chamber 66 which changes the spring rate of the piston 46. Therefore, in this embodiment, the amount of liquid 44 in the housing 28 is changed. Meaning, the amount of the liquid 44 disposed in the housing 28 can be increased or decreased. Changing the amount of liquid 44 in the second chamber 66 can move the member 76 in the second chamber 66. In this embodiment, the plunger 146 of the actuator 144 is eliminated.

Generally, there is a fixed volume of the liquid 44 inside the housing 28. However, when utilizing the actuator 144 that can add or remove the liquid 44, the volume of the liquid 44 inside the housing 28 is variable, i.e., not fixed. The actuator 144 can be a hydraulic actuator, a pneumatic actuator or any other suitable actuator. When utilizing the pneumatic actuator, the actuator 144 can include an air accumulator to act as an air spring.

Referring to FIG. 19, a controller 148 can be in communication with the actuator 144 to selectively actuate the actuator 144. Therefore, the controller 148 can signal the motor to move the plunger 146 or stop movement of the plunger 146. Alternatively, the controller 148 can signal the actuator 144 to add liquid 44 into the first chamber 38 or the second chamber 66. Furthermore, the controller 148 can signal the actuator 144 to remove some of the liquid 44 from the first chamber 38 or the second chamber 66.

The controller 148 can be part of an electronic control module that is in communication with various components of the vehicle. The controller 148 includes a processor 150 and a memory 152 on which is recorded instructions for communicating with the actuator 144 and optionally other components of the vehicle. The controller 148 is configured to execute the instructions from the memory 152, via the processor 150. For example, the controller 148 can be a host machine or distributed system, e.g., a computer such as a digital computer or microcomputer, acting as a vehicle control module having a processor and the memory 152. The memory 152 can be tangible, non-transitory computer-readable memory such as read-only memory (ROM) or flash memory. The controller 148 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 148 can include all software, hardware, memory 152, algorithms, connections, sensors, etc., necessary to monitor and control the actuator 144, etc. As such, a control method can be embodied as software or firmware associated with the controller 148. It is to be appreciated that the controller 148 can also include any device capable of analyzing data from various sensors, comparing data, making the necessary decisions required to control and monitor the actuator 144, etc.

The operation of the active damper assembly 10 will be briefly discussed below for illustrative purposes. The difference between the active damper assembly 10 from the passive damper assembly 10 and the adaptive damper assembly 10 is the active damper assembly 10 further includes the actuator 144. Therefore, the active damper assembly 10 includes the piston 46, the first and second restrictor valves 58, 92, the first and second one-way valves 64, 98 and the second chamber 66 as discussed above, and the details of the operation of these components will not be re-discussed. Optionally, the active damper assembly 10 can include the first and second ER valves 124, 126 and the operation with these ER valves 124, 126 will not be re-discussed.

The spring rate or preload can be changed during the operation of the vehicle or before/after operating the vehicle. Therefore, when it is desired to change the spring rate or preload, the actuator 144 is actuated. As such, actuation of the actuator 144 can occur before, during or after operating the piston 46, the first and/or second restrictor valves 58, 92, the first and/or second one-way valves 64, 98, and optionally, the first and/or second ER valves 124, 126.

Changing the internal pressure of the actuator 144 controls the height of the vehicle, and thus adjusting the actuator 144 can automatically level the vehicle. By changing the internal pressure of the actuator 144, the position of the rod 52 relative to the housing 28 changes which changes the height of the vehicle relative to the road 14. For example, in certain embodiments, the controller 148 communicates with the actuator 144 to move the plunger 146 which changes the internal pressure of the actuator 144, and thus changes the spring rate. When the plunger 146 moves to further compress the gaseous fluid 74, the spring rate increases and when the plunger 146 moves to decompress the gaseous fluid 74, the spring rate decreases. As another example, in certain embodiments, the controller 148 communicates with the actuator 144 which causes the amount of liquid 44 in the housing 28 to be changed which changes the internal pressure of the actuator 144, and thus changes the spring rate. When some of the liquid 44 is added either to the second chamber 66 or the first chamber 38, the spring rate increases and when some of the liquid 44 is removed from the second chamber 66 or the first chamber 38, the spring rate decreases. When the desired spring rate is achieved, the actuator 144 is de-activated.

The present disclosure also provides a method of forming the damper assembly 10. By forming the damper assembly 10 as described herein, this process can reduce manufacturing costs.

The method includes extruding the housing 28 formed of aluminum. In other words, the housing 28 is formed of extruded aluminum. By utilizing aluminum for the housing 28, the mass of the housing 28 can be reduced. The extruded housing 28 is formed defining the first chamber 38 and the first passage 40 spaced from each other. The first chamber 38 and the first passage 40 are formed in the aluminum housing 28 in the non-concentric configuration.

Furthermore, extruding the housing 28 formed of aluminum can be further defined as extruding the housing 28 to further define the second chamber 66 and the second passage 68. Therefore, the extruded housing 28 can be formed defining the second chamber 66 and the second passage 68 spaced from each other and each spaced from the first chamber 38 and the first passage 40. The first and second chambers 38, 66 and the first and second passages 40, 68 are formed in the aluminum housing 28 substantially parallel to each other in a non-concentric orientation. Having the housing 28 formed of extruded aluminum with the first and second chambers 38, 66 and the first and second passages 40, 68 being substantially parallel to each other allows the housing 28 to be formed in a cost effective way. For example, drilling, milling, etc., of the housing 28 is minimized with this arrangement of chambers 38, 66 and passages 40, 68. It is to be appreciated that the extruded aluminum is cut to create the desired length of the housing 28. Furthermore, forming the housing 28 of aluminum can improve heat dispersion.

The method further includes milling the first distal end 30 of the housing 28 to partially form the first inlet 42 that fluidly connects the first chamber 38 and the first passage 40. When one of the caps 102 is secured to the first distal end 30 of the housing 28, that cap 102 partially forms the first inlet 42 (see FIG. 9). Therefore, the housing 28 and the cap 102 cooperate to define the first inlet 42.

The method can further include milling the second distal end 32 of the housing 28 to partially form the first outlet 62 that fluidly connects the first chamber 38 and the first passage 40. When another one of the caps 102 is secured to the second distal end 32 of the housing 28, that cap 102 partially forms the first outlet 62 (see FIG. 9). Therefore, the housing 28 and the cap 102 cooperate to define the first outlet 62.

The method can also include milling the first distal end 30 of the housing 28 to partially form the second outlet 96 that fluidly connects the first chamber 38 and the second passage 68. As discussed above, the first inlet 42 and the second outlet 96 are spaced from each other along the first distal end 30 of the housing 28. When one of the caps 102 is secured to the first distal end 30 of the housing 28, that cap 102 partially forms the second outlet 96 (see FIG. 10). Therefore, the housing 28 and the cap 102 cooperate to define the second outlet 96.

The method can also include milling the second distal end 32 of the housing 28 to partially form the second inlet 72 that fluidly connects the first chamber 38 and the second passage 68. As discussed above, the first outlet 62 and the second inlet 72 spaced from each other along the second distal end 32 of the housing 28. When one of the caps 102 is secured to the second distal end 32 of the housing 28, that cap 102 partially forms the second inlet 72 (see FIG. 10). Therefore, the housing 28 and the cap 102 cooperate to define the second inlet 72.

The caps 102 can be cold formed, machined or formed by any other suitable methods. Furthermore, the caps 102 can be attached or secured to the housing 28 by any suitable methods. For example, the caps 102 can be press fit, friction fit, interference fit, adhered, welded, crimped, etc., to the housing 28. Therefore, the method can include attaching the plurality of caps 102 to the housing 28. As such, the caps 102 close or plug the ends 104, 106, 112, 114 of the first and second chambers 38, 66 and the ends 108, 110, 116, 118 of first and second passages 40, 68.

Figures 15, 16:
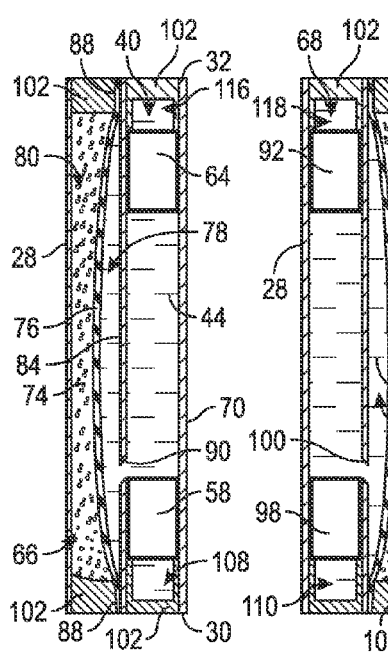
FIG. 15 is a schematic cross-sectional view of the damper assembly taken from lines Y-Y of FIG. 11.
FIG. 16 is a schematic cross-sectional view of the damper assembly taken from lines Z-Z of FIG. 11.

The method can further include drilling the housing 28 between the first passage 40 and the second chamber 66 to define the first pathway 90 that fluidly connects the first passage 40 and the second chamber 66. Generally, the first pathway 90 is disposed between the first inlet 42 and the first outlet 62. The first pathway 90 can be drilled in any suitable orientation. FIGS. 7 and 15 illustrate the first pathway 90 disposed at an angle, or transverse, relative to the first passage 40 due to the available space to insert a tool into one of the first passage 40 and the second chamber 66 to drill the first pathway 90. FIG. 17 illustrates another alternative of the orientation of the first pathway 90 in which the first pathway 90 is disposed substantially perpendicular to the first passage 40.

The method can further include drilling the housing 28 between the second passage 68 and the second chamber 66 to define the second pathway 100 that fluidly connects the second passage 68 and the second chamber 66. Generally, the second pathway 100 is disposed between the second inlet 72 and the second outlet 96. The second pathway 100 can be drilled in any suitable orientation. FIGS. 8 and 16 illustrate the second pathway 100 disposed at an angle, or transverse, relative to the second passage 68 due to the available space to insert a tool into one of the second passage 68 and the second chamber 66 to drill the second pathway 100. FIG. 18 illustrates another alternative of the orientation of the second pathway 100 in which the second pathway 100 is disposed substantially perpendicular to the second passage 68.

Once the pathways 90, 100 and passages 40, 68 are formed, various components can be positioned, disposed or inserted in the housing 28. For example, the piston 46, the member 76, the first and second restrictor valves 58, 92, the first and second one-way valves 64, 98 and optionally, the first and second ER valves 124, 126 can be positioned, disposed or inserted in the housing 28, some of which are discussed below.

The method also includes disposing the piston 46 in the first chamber 38. Generally, disposing the piston 46 in the first chamber 38 can occur after milling the first and second distal ends 30, 32 of the housing 28 to partially form the first inlet 42, the first outlet 62, the second inlet 72 and the second outlet 96. Also, disposing the piston 46 in the first chamber 38 can occur after drilling the housing 28 to define the first pathway 90 and the second pathway 100. It is to be appreciated that the piston 46 can be disposed in the first chamber 38 in any suitable order. The piston 46 is disposed in the first chamber 38 before securing the cap 102 (i.e., the cap 102 that covers the second end 112 of the first chamber 38) to the second distal end 32 of the housing 28. It is to be appreciated that the rod 52 can be inserted in the first chamber 38 with the piston 46.

The method further includes inserting the first restrictor valve 58 in the first passage 40. In certain embodiments, the first restrictor valve 58 is inserted in the first passage 40 proximal to the first inlet 42. The first restrictor valve 58 can be press fit, interference fit, etc., into the first passage 40 to position the first restrictor valve 58 in the desired position in the first passage 40. Optionally, the housing 28 can present a first shoulder inside the first passage 40, and the first restrictor valve 58 can be inserted into the first passage 40 until the first restrictor valve 58 abuts the first shoulder in the first passage 40 to position the first restrictor valve 58 in the desired position. When utilizing the first shoulder in the first passage 40, the first shoulder can be formed in the first passage 40 by milling, drilling or any other suitable method.

The method can further include inserting the first one-way valve 64 in the first passage 40. In certain embodiments, the first one-way valve 64 is inserted in the first passage 40 proximal to the first outlet 62. The first one-way valve 64 can be press fit, interference fit, etc., into the first passage 40 to position the first one-way valve 64 in the desired position in the first passage 40. Optionally, the housing 28 can present a second shoulder inside the first passage 40, and the first one-way valve 64 can be inserted into the first passage 40 until the first one-way valve 64 abuts the second shoulder in the first passage 40 to position the first one-way valve 64 in the desired position. When utilizing the second shoulder in the first passage 40, the second shoulder can be formed in the first passage 40 by milling, drilling or any other suitable method.

The method can also include inserting the second restrictor valve 92 in the second passage 68. In certain embodiments, the second restrictor valve 92 is inserted in the second passage 68 proximal to the second inlet 72. The second restrictor valve 92 can be press fit, interference fit, etc., into the second passage 68 to position the second restrictor valve 92 in the desired position in the second passage 68. Optionally, the housing 28 can present a first shoulder inside the second passage 68, and the second restrictor valve 92 can be inserted into the second passage 68 until the second restrictor valve 92 abuts the first shoulder in the second passage 68 to position the second restrictor valve 92 in the desired position. When utilizing the first shoulder in the second passage 68, the first shoulder can be formed in the second passage 68 by milling, drilling or any other suitable method.

The method can further include inserting the second one-way valve 98 in the second passage 68. In certain embodiments, the second one-way valve 98 is inserted in the second passage 68 proximal to the second outlet 96. The second one-way valve 98 can be press fit, interference fit, etc., into the second passage 68 to position the second one-way valve 98 in the desired position in the second passage 68. Optionally, the housing 28 can present a second shoulder inside the second passage 68, and the second one-way valve 98 can be inserted into the second passage 68 until the second one-way valve 98 abuts the second shoulder in the second passage 68 to position the second one-way valve 98 in the desired position. When utilizing the second shoulder in the second passage 68, the second shoulder can be formed in the second passage 68 by milling, drilling or any other suitable method.

The first and second restrictor valves 58, 92 and the first and second one-way valves 64, 98 can be inserted in the appropriate passage 40, 68 in any desired order. Once the first restrictor valve 58 and the first one-way valve 64 are inserted in the first passage 40, the ends 108, 116 of the first passage 40 can be closed with the caps 102. Similarly, once the second restrictor valve 92 and the second one-way valve 98 are inserted in the second passage 68, the ends 110, 118 of the second passage 68 can be closed with the caps 102.

The method can also include inserting the member 76 in the second chamber 66. Once the member 76 is inserted in the second chamber 66, the first and second ends 106, 114 of the second chamber 66 can be closed with the caps 102. Furthermore, once the various components are disposed in the housing 28 and various caps 102 attached to the housing 28, the liquid 44 is injected into the housing 28 and the gaseous fluid 74 is injected into the second chamber 66.

When the damper assembly 10 utilizes the first and second ER valves 124, 126, the method can also include inserting the first ER valve 124 in the first passage 40 and inserting the second ER valve 126 in the second passage 68. The first ER valve 124 is inserted into the first passage 40 before one of the first restrictor valve 58 or the first one-way valve 64. Similarly, the second ER valve 126 is inserted into the second passage 68 before one of the second restrictor valve 92 or the second one-way valve 98. Additionally, when the damper assembly 10 utilizes the actuator 144, the method can include coupling the actuator 144 to the housing 28. It is to be appreciated that the method can include other features described herein.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A damper assembly comprising:
   a housing defining a first chamber and a first passage spaced from each other, wherein the housing defines a first inlet that fluidly connects the first chamber and the first passage, with the first chamber, the first passage and the first inlet each configured to contain a liquid;
   a piston disposed in the first chamber and movable in a first direction and a second direction opposite the first direction, with the piston configured to displace the liquid during movement in the first and second directions; and
   a first restrictor valve disposed in the first passage and configured to restrict a flow of the liquid into the first passage from the first chamber and the first inlet as the piston moves in one of the first and second directions which causes the liquid in the first chamber to increase a pressure applied to a first side of the piston to dampen movement of the piston;
   a first one-way valve disposed in the first passage;
   wherein the first passage is elongated along a first axis, with the first one-way valve and the first restrictor valve spaced apart axially relative to each other along the first axis.

2. The assembly as set forth in claim 1 wherein the first chamber and the first passage are substantially parallel to each other in a non-concentric orientation.

3. The assembly as set forth in claim 1:
   wherein the housing defines a first outlet that fluidly connects the first chamber and the first passage, with the first outlet configured to contain the liquid;
   wherein the first one-way valve is disposed in the first passage to prevent the flow of the liquid into the first passage from the first outlet; and
   wherein the first restrictor valve is disposed proximal to the first inlet and the first one-way valve is disposed proximal to the first outlet.

4. The assembly as set forth in claim 3 further including a first electrorheological valve disposed in the first passage axially between the first restrictor valve and the first one-way valve along the first axis, with the first electrorheological valve selectively energized to selectively restrict the flow of the liquid through the first passage which causes the liquid in the first chamber to increase the pressure applied to the first side of the piston to dampen movement of the piston.

5. The assembly as set forth in claim 3:
   wherein the housing includes a first cap that closes a first end of the first chamber and defines a portion of the first inlet; and
   wherein the housing includes a second cap that closes a second end of the first chamber and defines a portion of the first outlet.

6. The assembly as set forth in claim 1:
   wherein the housing defines a second chamber and a second passage spaced from each other, and the housing defines a second inlet that fluidly connects the first chamber and the second passage; and
   wherein the second chamber, the second passage and the second inlet are each configured to contain the liquid.

7. The assembly as set forth in claim 6 wherein the first and second chambers and the first and second passages are substantially parallel to each other in a non-concentric orientation.

8. The assembly as set forth in claim 6:
wherein the housing defines a first pathway disposed between the first restrictor valve and the first one-way valve to fluidly connect the first passage and the second chamber, with the first pathway configured to contain the liquid; and
wherein the housing defines an entrance of the first pathway between the first restrictor valve and the first one-way valve, with the first restrictor valve completely contained upstream of the entrance of the first pathway.

9. The assembly as set forth in claim 6 further including a second restrictor valve disposed in the second passage and configured to restrict the flow of the liquid into the second passage as the piston moves in the other one of the first and second directions which causes the liquid in the first chamber to increase a pressure applied to a second side of the piston to dampen movement of the piston.

10. The assembly as set forth in claim 9:
wherein the housing defines a second outlet that fluidly connects the first chamber and the second passage, with the second outlet configured to contain the liquid;
further including a second one-way valve disposed in the second passage to prevent the flow of the liquid into the second passage from the second outlet; and
wherein the second passage is elongated along a second axis, with the second one-way valve and the second restrictor valve spaced apart axially relative to each other along the second axis, and wherein the second restrictor valve is disposed proximal to the second inlet and the second one-way valve is disposed proximal to the second outlet.

11. The assembly as set forth in claim 10 further including a second electrorheological valve disposed in the second passage axially between the second restrictor valve and the second one-way valve along the second axis, with the second electrorheological valve selectively energized to selectively restrict the flow of the liquid through the second passage which causes the liquid in the first chamber to increase the pressure applied to the second side of the piston to dampen movement of the piston.

12. The assembly as set forth in claim 10 wherein the housing defines a second pathway disposed between the second restrictor valve and the second one-way valve to fluidly connect the second passage and the second chamber, with the second pathway configured to contain the liquid; and
wherein the housing defines an entrance of the second pathway between the second restrictor valve and the second one-way valve, with the second restrictor valve completely contained upstream of the entrance of the second pathway.

13. The assembly as set forth in claim 10:
wherein the housing includes a first cap that closes a first end of the first chamber and a first end of the second chamber, and the first cap defines a portion of the first inlet and a portion of the second outlet;
wherein the housing includes a second cap that closes a second end of the first chamber and defines a portion of the second inlet; and
wherein the housing includes a third cap that closes a second end of the second chamber.

14. The assembly as set forth in claim 6 further including a member disposed in the second chamber and at least partially movable in the second chamber as the piston moves in the first and second directions, with the member splitting the second chamber into a first cavity and a second cavity, and with the first cavity configured to contain the liquid and the second cavity configured to contain a gaseous fluid.

15. The assembly as set forth in claim 14 further including an actuator coupled to the second chamber and including a plunger selectively movable in the second chamber to selectively change a pressure applied to the member which changes a spring rate of the piston.

16. The assembly as set forth in claim 1 further including an actuator coupled to the first chamber and selectively actuated to change an amount of the liquid in the first chamber which changes a spring rate of the piston.

17. A damper assembly comprising:
a housing defining a first chamber and a first passage spaced from each other and substantially parallel to each other in a non-concentric orientation, wherein the housing defines a first inlet that fluidly connects the first chamber and the first passage, with the first chamber, the first passage and the first inlet each configured to contain a liquid;
a piston disposed in the first chamber and movable in a first direction and a second direction opposite the first direction, with the piston configured to displace the liquid during movement in the first and second directions; and
a first restrictor valve disposed completely inside the first passage and configured to restrict a flow of the liquid into the first passage from the first inlet as the piston moves in one of the first and second directions which causes the liquid in the first chamber to increase a pressure applied to a first side of the piston to dampen movement of the piston;
a first one-way valve disposed completely inside the first passage.

18. The assembly as set forth in claim 17:
wherein the housing defines a second chamber and a second passage spaced from each other;
wherein the first and second passages are substantially parallel to each other in a non-concentric orientation;
further including a second restrictor valve disposed completely inside the second passage and configured to restrict the flow of the liquid into the second passage as the piston moves in the other one of the first and second directions which causes the liquid in the first chamber to increase a pressure applied to a second side of the piston to dampen movement of the piston; and
further including a second one-way valve disposed completely inside the second passage, with the second one-way valve and the second restrictor valve spaced apart axially relative to each other along the second passage.

* * * * *